United States Patent [19]

Gomory

[11] 3,775,232

[45] Nov. 27, 1973

[54] SECURING AN EXTRUDATE INTO A BASE MATERIAL

[75] Inventor: Paul L. Gomory, Bethesda, Md.

[73] Assignee: Phillips Petroleum Company, Bartlesville, Okla.

[22] Filed: Apr. 23, 1970

[21] Appl. No.: 31,245

[52] U.S. Cl............ 161/62, 28/72.12, 156/72, 161/67, 161/160, 264/45, 264/84, 260/2.5 D
[51] Int. Cl............................................. D03d 27/00
[58] Field of Search............... 161/53, 62, 64, 67, 161/66, 159, 160, 170; 264/211, 45, 47, 249, 84; 28/72.12; 112/410; 156/79, 167, 176, 177, 178, 244, 72, 293, 294

[56] References Cited

UNITED STATES PATENTS

| | | | |
|---|---|---|---|
| 3,382,121 | 5/1968 | Sherlock | 156/294 X |
| 3,474,050 | 10/1969 | Chappelear et al. | 161/170 X |
| 3,145,446 | 8/1964 | Sussman | 28/72.12 |
| 3,400,188 | 9/1968 | Olson | 161/159 X |
| 3,485,282 | 12/1969 | Lopez et al. | 264/249 X |
| 3,285,797 | 11/1966 | Harrison et al. | 161/67 |

FOREIGN PATENTS OR APPLICATIONS

| | | | |
|---|---|---|---|
| 466,452 | 5/1937 | Great Britain | 264/45 |
| 466,453 | 5/1937 | Great Britain | 264/45 |

Primary Examiner—George F. Lesmes
Assistant Examiner—M. E. McCamish
Attorney—Young and Quigg

[57] ABSTRACT

An extrudate element is inserted into a base material so that a portion of the extrudate enters into or traverses the base material. The inserted extrudate element, the constituent of the base material, or both are composed of an expandable extrudate containing an expansion agent. The expansion agent is activated during or after insertion of the extrudate element to cause enlargement of the expandable extrudate and/or the substrate or base. This enlargement fixes the extrudate element into the base material by tightening the inserted element against the base material to wedge it in place, as by causing portions of the inserted element to enter interstices of the base material, or by causing the inserted element to expand on both sides of the insertion opening to a diameter greater than that of the insertion opening. The insertion and subsequent fixing into a base material of a plurality of elements produces a pile surfaced article. In one embodiment a plurality of elements composed of a foamable material containing a suitable foaming agent is extruded directly through a base material and foamed, thereby locking the foamed elements into the backing to form a pile surface of foamed extrudate.

6 Claims, 17 Drawing Figures

INVENTOR.
P. L. GOMORY

SECURING AN EXTRUDATE INTO A BASE MATERIAL

This invention relates to fixing an extrudate element into a base material. In one of its aspects, it relates to the production of an article comprising a plurality of extrudate elements fixed into a base material. In another of its aspects, this invention relates to fixing an element of expandable extrudate into another body to form a unitary structure. In still another of its aspects, it relates to the production of a scrim-like sheet of expandable extrudate. In yet another of its aspects, it relates to the production of an article with a pile surface of expanded extrudate.

In one concept of the invention it provides a method for fixing an extrudate into a base material by inserting an expandable extrudate element containing an expansion agent into the base material and activating the expansion agent causing the extrudate to expand. In another of its concepts, the invention provides a method for fixing an extrudate element into a base material by inserting an extrudate element into an expandable backing material containing an expansion agent and activating the expansion agent causing the backing to expand. In another concept of the invention a method is provided for fixing an extrudate into a base material in which expandable extrudates containing expansion agents are extruded at least into a base material, contacted on extrusion, and expanded thereby joining the extrudates to form a single element fixed into the backing material. In still another of its concepts, the invention provides a method for fixing an extrudate into a base material in which an expandable extrudate containing an expansion agent is extruded in a bead along the surface of a base material as another expandable extrudate element containing an expansion agent is extruded through the backing material to contact the extrudate bead thereby joining the extrudates to fix the elements extruded through the base material securely into the base material.

Numerous methods are known for securing extrudates to a base material. The most common method of attaching extruded strands to a backing is by tufting, in which operation the locking of the strands into the backing depends on the enlargement of the tufting yarn at the surface of the backing by "blooming" or unwinding of the plurality of filaments that have been needled or punched through a single aperture as a single yarn. Another method for locking extrudates into a backing which is often used when the material inserted or the backing material is heat softenable is to heat treat the reverse side of the backing so that the material is softened and sealed on the reverse side of the base sheet. A variation of this method is disclosed in U.S. Pat. No. 3,382,122 issued May 7, 1968, in which hot plastic is extruded from a reciprocating or rotating orifice which is moved in relation to the base sheet in such a manner that looped thread is bonded directly on to the surface of the base sheet before the hot plastic cools below its melting temperature. Still another method used to secure extruded filaments to a backing is that taught in U.S. Pat. No. 3,145,446, issued Aug. 25, 1964, in which the extrudate is passed through a shrinkable backing and later the backing is shrunk to lock the filaments in place.

I have conceived that an extrudate element inserted in a base material can be fixed into the base material by employing an expandable extruded material containing an expansion agent in the inserted element, the material of construction of the base material, or both, and causing the expandable extrudate to expand as or after the insertion of the extruded element is carried out. The range of articles that can be produced using this method includes such diverse items as a single elongated, extruded shaft expanded and heat sealed into a wheel or gear element, as used in toy automobiles, and a game ball with an expanded extrudate surface, i.e., a tennis ball. By fixing a plurality of extruded elements into a base material a variety of useful articles depending on the size and spacing of the elements can be produced ranging from soft fabric surfaces, to looped carpeting, to packing sheets, to extruded aircraft landing strip surfaces among others.

It is an object of this invention to produce an extrudate fixed into another or a base material. It is another object of this invention to produce a unitary article comprising an elongated, expanded extrudate fixed into a preshaped article. It is still another object of this invention to produce an article with a surface made of a plurality of elongated, expanded extrudate elements fixed into a base material. It is still another object of this invention to produce a pile surfaced article of expanded extrudate. It is still another object of this invention to produce a reversible pile surfaced article of expanded extrudate. It is still another object of this invention to produce a pile surfaced article in which the extrudate forms a seal at least on the surface of the base sheet. It is yet another object of this invention to produce a scrim-like base sheet made of expandable extrudate. Yet another object of this invention is to provide a fine or exploded textured expanded filamentous material. A further object still is to make a carpeting or an upholstery material of expanded extrudate.

Other aspects, concepts and objects of this invention are apparent from a study of this disclosure, the drawing and the appended claims.

According to this invention, an extrudate element is contacted with a base material by penetrating and/or traversing the base material, in which either the extrudate element or the base material or both are comprised of expandable extrudate containing expansion agent, and the expansion agent is activated to cause the extrudate to become fixed or locked together with said material.

The expansion of the extrudate fixes the extrudate element into the base material. The extrudate is fixed into the base material by any or all of the following means: expansion of an inserted extrudate element or the base material or both exerts force on all adjacent surfaces the interacting pressure of which holds the expanded extrudate against the adjacent surface; porosity of the adjacent surface allows penetration by the expanding extrudate thereby locking the surface together; the expanding extrudate element tends to expand to a greater diameter outside the matrix of the base material where the pressure opposing expansion is less, so that extrudate elements extending on both sides of the base material are fixed in the base material by expanding outside the insertion opening to a greater diameter than the insertion opening. Insertion of a plurality of closely spaced elongated, expandable extrudate elements into a base material produces a surface of expanded extrudate. By inserting the elongated, expandable extrudate elements through the backing material an expanded extrudate surface is produced on both sides of the backing material. Abusing the extrudate surface produces a fine filamented surface of silken softness.

Also according to this invention there are produced scrim-like base sheets made of expandable extrudate that has been woven or knitted in any conventional manner from continuous elongated, unexpanded or partially expanded extrudate containing an expanding agent. The extrudate is produced in continuous elements at conditions that will not permit complete expansion. After insertion of extrudate elements into the base sheets produced from this material, conditions are imposed that cause expansion in the elements comprising the base sheet. This expansion exerts a compression force on the inserted extrudate elements which fixes the inserted elements into the base material.

Non-woven fibrous base sheets can also be produced from expandable extrudate containing expansion agent by compressing discontinuous, elongated elements in a random pattern. The subsequent expansion of the extrudate by activating the expansion agent interlocks the extrudate elements of the base sheet with each other and also with any extrudate elements that have been inserted into the base material. Where expandable extrudate elements have been inserted into this type backing the locking effect of the expansion of the inserted elements and the expandable base is fortified. The penetration of the base sheet elements by expandable inserted elements and the subsequent expansion of these elements enhances the locking effect.

By this invention an expandable extrudate can be inserted in any base material and expanded effectively to fix the extrudate element into the base material. Also a matrix of expandable base material can be expanded to hold in place an element of any extrudate material inserted in it. It is now preferred that the extrudate element held by an expanded base material be a compressible or porous extrudate.

The materials which can be used to produce expandable elements suitable for insertion into the base material or for production of an expandable base material in this invention can be any expandable extrudable material. In one preferred embodiment foamable extrudates are used. Well known extrusion techniques are used to produce a foamable element comprising a foamable material containing a foaming agent. Depending on the characteristics desired for the final product the extrudate elements can be chosen from any of the known foamable materials and compatible foaming agents. Various gaseous, liquid, and solid foaming agents are effective in the process of the invention. In general these agents comprise materials which are gaseous at the temperatures of the molten plastic or polymer at the extrusion die. Solid materials which decompose at these temperatures and yield gaseous products or components which react with other ingredients present in the melt to produce gaseous products are applicable. Any inert gas which is nondeleterious to the polymer or plastic being extruded is feasible. Such gases include $N_2$, steam, $CO_2$, low boiling hydrocarbons (propane, butane, pentane), and freon. Liquids include water, ammonia, and hydrocarbons which vaporize at the extrusion temperatures as pressure outside of the die is released. Solid materials include p,p'-oxibis (benzenesulfonyl hydrazide) which is sold under the trade name of "Celogen" by Naugatuck Chemical, a division of the United States Rubber Company; diazoaminobenzene, dinitrosopentamethylenetetramine, 4-nitrobenzene sulfonic acid hydrazide, beta-naphthalene sulfonic acid hydarzide, diphenyl-4,4'-di(sulfonyl azide), and mixtures of materials such as sodium bicarbonate with a solid acid such as tartaric acid.

The amount of foaming agent to be used in the process is in the range of 0.01 to 50 weight percent of the polymer or plastic being extruded. Amounts in the range of 1 to 15 weight percent are preferred.

The temperature employed at the extrusion die varies with the type of plastic or polymer being extruded, it being essential that the molten plastic be at a temperature which facilitates efficient extrusion. The extrusion temperatures of various plastics and polymers are well known in the art. Generally extrusion temperature will be in the range of about 250° to 600°F. and usually in the range of 350° to 5502 F. Extrusion pressures will vary with the type of plastic or polymer and the foaming agent incorporated therein and will range from about atmospheric to as high as 700 or 800 psig.

The size and shape of the foamable element is restricted only by the relationship of the size and shape of the element to the physical attributes of the base material or base sheet which will be made from it or in which it will be inserted. The conditions of extrusion are controlled to produce an unfoamed extrudate containing a foaming agent, a foamable but only partially foamed extrudate, or an extrudate that foams completely as it is extruded. The conditions required for producing each of these results for various expandable materials are known in the art.

In another embodiment of the invention, elements of expandable extrudate are produced which have embedded in the surface of the extrudate small components of material which upon, say, heat treatment will explode. The explosive elements can be incapsulated gases such as carbon dioxide, freons and the like, or explosive compounds, such as, mercury fulminate, diazodinitrophenol, lead azide, ammonium nitrate, nitroglycerin, trinitrotoluene, ammonium picrate, ammonium perchlorate and the like. The explosion of the embedded particles tears the surface of the extrudate causing it to expand outward. Explosions occuring in the portion of the extrudate inserted in the interior of the base material carry extrudate which is still attached to the surface of the expanding element into the base sheet thereby anchoring the extrudate in the base material. Explosions in the surface of base material elements similarly penetrate the inserted extrudate element to anchor it to the base material. Explosions in the extrudate above either surface of the base material cause an increase in diameter of the inserted extrudate element preventing the element from moving through the aperture into which it was inserted.

Base materials that can be used in this invention are limited only by practical considerations in inserting the extrudate into the backing material. Either a porous or nonporous, expandable or nonexpandable backing material can be used. The inserted extrudate is locked into a backing by passing it into or through the base material and expanding either the inserted element or base material or both. To further secure an expanded extrudate element inserted into a backing, the base sheet can be made of a material that will shrink on treatment. This will give the same effect of squeezing tightly against the expanded insertion elements that is accomplished by employing an expandable base material. A definite advantage of the invention is that a non-woven fibrous web can be used as a backing material. Penetration of the interstices of the non-woven web by the expanding extrudate will actually strengthen this type of backing which may or may not have been stiffened or set prior to the expansion of the inserted extrudate.

The embodiments of this invention can best be understood by reference to the drawing and the description of the figures which are to be regarded as illustrative in nature, and not as restrictive.

Figure 1:
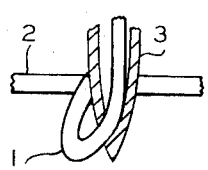
FIG. 1 shows the insertion of an elongated extrudate element into a backing material.
Figure 2:
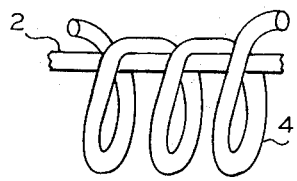
FIG. 2 shows a continuous elongated extrudate element inserted in a base material to form a looped pile on one side of the base material.
Figure 3:
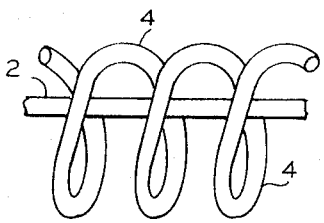
FIG. 3 shows a continuous elongated extrudate element inserted into a base material to form a looped pile on both surfaces of the base material.

Any of the known methods of inserting a filament into a backing material can be used to insert the extrudate element into the backing in this invention. Referring to FIG. 1 continuous elements of unexpanded, or partially expanded extrudate containing expansion agent (1) are passed through the base material (2) by methods well known in the art of tufting such as passing a hollow tufting needle (3) through the base material. This unexpanded extrudate forms a continuous looped pile (4) on one (FIG. 2) or both sides (FIG. 3) of the base material. During this process, loops can be cut to form single filaments. After insertion into the backing the extrudate is subjected to conditions which will cause the expansion that fixes the extrudate into the backing material.

Figure 4:
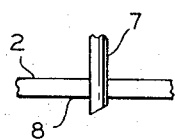
FIG. 4 shows an extrusion device inserted through a base material.
Figure 5:
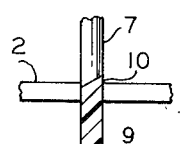
FIG. 5 shows an extrudate element produced by extrusion through an extrusion device inserted through a base material and continuous extrusion while withdrawing the extrusion device through the base material terminating extrusion on the side of withdrawal.
Figure 6:
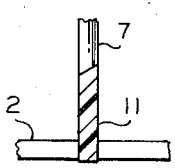
FIG. 6 shows the extrudate element produced by simultaneously beginning extrusion and withdrawal of the extrusion device inserted through a base material continuing extrusion for a distance from the side of the base material from which the extrusion device is withdrawn.
Figure 7:
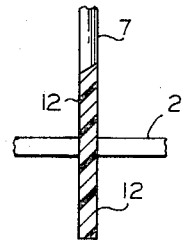
FIG. 7 shows an extrusion element extruded on both sides of the base material.

In a preferred embodiment of the invention expandable material is extruded directly into or through the backing material. In FIG. 4 the backing material (2) is held securely and the extrusion device (7) is inserted through the backing material to the opposite side of the backing (8). Extrusion is begun, producing an extrudate of the length desired (9) (FIG. 5) and continued as the needle retreats (10) (FIG. 6) through the backing material. Extrusion is terminated when the desired amount of extrudate has formed at least one (11) (FIG. 6) if not on both sides (12) (FIG.7) of the base material. The extrudate is separated by cutting or by breaking the extrudate as the extrusion device retreats from the base material. Extrusion can be controlled so that an elongated extrudate is produced on the side from which the extrusion device is withdrawn, (FIG.5) on the side to which it withdraws, (FIG. 6) or on both sides of the base material (FIG. 7). When the extrudate is not to extend through the base material and particularly when using a porous base material, extrusion and withdrawal of the extruding device can begin when sufficient penetration of the base material has been achieved to insure that expansion of the extrudate will lock the expanded extrudate into the base material. Extrusion and withdrawal of the extrusion device are simultaneously continued until an elongated extrudate of the desired length is obtained. When there is extrusion directly into the backing material, extrusion may be carried out at conditions sufficient to cause simultaneous expansion of the extrudate. The extrudate expands immediately upon leaving the extrusion device.

It will be understood by one skilled in the art in possession of this disclosure that the precise method of causing the filament to abut or reach into the base material can be varied thus, it is possible to eject the filamentous material toward the base material or to move the base material toward filamentous material and to apply heat sufficient to cause softening to adhesive condition to the one or other of said base or said filamentous material to cause them to combine physically as herein described or otherwise.

Thus the filament or fiber containing the expanding agent can be heated on its way toward the carpet backing in the event that a carpet is being produced. Further, it is possible for some or all of the filaments not to contain any expanding agent and for these filaments to be heated on their way or at the moment that they reach the carpet backing. In such event a juncture will take place between the filament and the carpet backing. In that event in which the filament contains no expanding agent the base or backing can contain expanding agent. However, this is not always necessary. It is possible that when ejecting or propelling the filamentous or fiber like material to the base that it and/or the base can be heated at the moment of the juxtaposition of the fiber and the base and in such event neither the filament nor the base need contain any expanding agent to cause adhesion or fusion together of the two elements.

In the event where the filament is ejected toward the base or in the case of the production of a carpet the yarn or filamentous material is forceably ejected toward the carpet backing there can be ejected one or more such filaments as with bursts of air pressure and heating means can be arranged to heat the ejecting or ejected filament as it travels toward the backing or at the time it reaches the said backing. In one form of the invention the filament and the backing are heated at the instant of juncture.

Thus according to this embodiment, here described, a concept basic thereto involves shooting, as it were, the filament or fiber or other object which is to be incorporated into the base material or attached thereto toward said base material.

Figure 8:
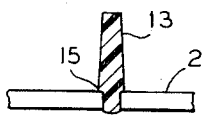
FIG. 8 shows an inserted element fixed into a base material by the interacting pressure of the surfaces of the expanded element and the base material.
Figure 9:
FIG. 9 shows an expanded element fixed into a base material by expansion of the inserted element into the interstices of the base material.
Figure 10:
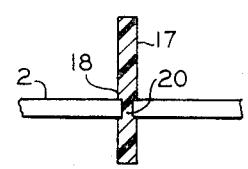
FIG. 10 shows an expanded inserted element fixed into a base material by expansion of the inserted element on both sides of the base material to a diameter greater than the diameter of the insertion opening.

The expansion of the extrudate fixes the extrudate element into the base material. The extrudate is fixed into the base material by any or all of the following means as shown in FIG. 8: Expansion of an inserted extrudate element (13) or of the base material (2) exerts forces on all adjacent surfaces (15) the interacting pressure of which holds the expanded extrudate against the adjacent matrix surface; as shown in FIG. 9 porosity of the adjacent surface allows penetration of the interstices (16) or as shown in FIG. 10 by the expanding extrudate thereby locking the surfaces together; the expanding extrudate element (17) tends to expand to a greater diameter (18) outside the matrix of the base material (2) where the pressure opposing expansion is less, so that extrudate elements extending on both sides of the base material are fixed in the base material (2) by expanding outside the insertion opening to a greater diameter than the insertion opening (20).

Figure 11:
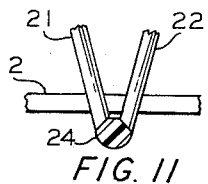
FIG. 11 shows the insertion of extrusion devices in such close proximity that the extrudates are united on extrusion.
Figure 12:
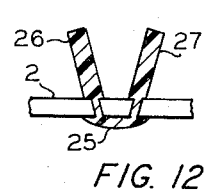
FIG. 12 shows united extrudate elements produced in FIG. 11.

In an embodiment of this invention employing the direct extrusion of expandable material through a base sheet, additional methods of fixing the extruded filaments to the base can be employed. In one such method at least a pair of extrusion devices (21) (22) close together are passed at least into the base material (2) parallel to or at an angle to each other (FIG.11). The positions of the extrusion devices as extrusion is begun cause the extrudates to meet (24) within or to the far side of the base material. Extrusion of expandable material and withdrawal of the extrusion devices are begun simultaneously. Extrudates from the two extrusion devices expand and unite (25) giving an additional means of locking the extrudate elements (26) (27) to the base sheet (FIG. 12). The angle at which the extrusion devices meet can be adjusted to produce a variety of interesting effects.

Figure 13:
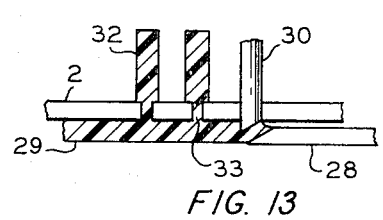
FIG. 13 shows inserted extrudate elements united with an extruded bead on one side of a base material.

In another embodiment an extrusion device (28) slowly extrudes the expandable material in a continuous bead (29) along one side of the base material as in FIG. 13. Another extrusion device (30) is positioned and timed to pass through the base material (2) and begin its extrusion and withdrawal through the base material so that extrudates (32) from the two extrusion heads unite to form a seal (33) at the surface of the base material.

Figure 14:
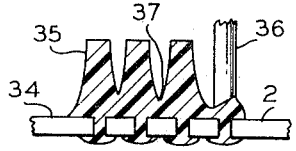
FIG. 14 shows extrudate elements united with each other on the side of a base material from which extrusion device is withdrawn.
Figure 15:
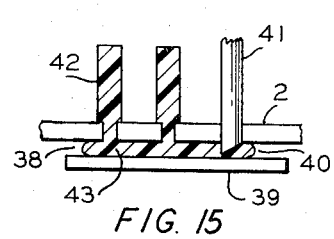
FIG. 15 shows extrusion elements united with each other on the side of the base material to which the extrusion device is inserted through the base material.

In another embodiment shown in FIG. 14 a pile surfaced article can be produced in which the surface of the backing material (34) from which the pile extends (35) is completely sealed from accumulation of dirt and dust by controlling the amount of expandable material extruded from the extrusion device (36) so that on expansion the filaments will fit tightly against each other (37) at the surface of the backing and in a now preferred embodiment will be sealed to each other. Similarly as shown in FIG. 15 the side of the base material away from the pile surface (38) can be sealed by supplying a barrier (39) close to that surface to allow enough excess expandable extrudate (40) to be forced from the extrusion device (41) and to be held close to that surface that on expansion the extrudates (42) form a seal (43) by tight abutment of expanded extrudate. Sealing at the surface of the base material is of special value if the base material is nonwoven, because this method affords added assurance that the backing will not part.

Figure 16:
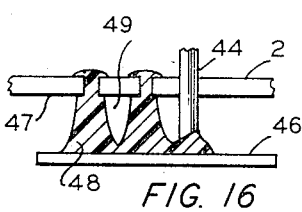
FIG. 16 shows mushroom topped extrudate elements joined at their tops to produce air spaces between the tops of the extrudate elements and the base material.
Figure 17:
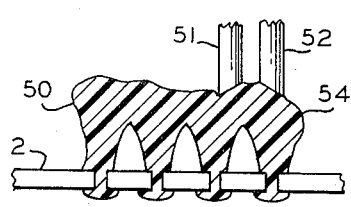
FIG. 17 illustrates method of producing mushroom topped extrudate elements joined at their tops to produce air spaces between the tops of the extrudates and the base material.

As is shown in FIG. 16 by passing the extrusion device (44) through the base material (2) and beginning the extrusion against a barrier (46) on the side away from which the extrusion device will be withdrawn, (47) an excessive initial extrusion rate will produce a mushroom topped extrudate (48). A seal can be obtained between the extruded elements, or by use of a partitioning agent during extrusion sealing between extrudate elements can be prevented and production of discrete elements can be assured. The air spaces (49) between the mushroom top and the backing surface give a cushion effect which is especially effective if the article produced is used as a shock absorbing surface, e.g., a rug, a packing sheet, or a shock absorbing device. As FIG. 17 shows, a mushroom topped extrudate (50) can also be produced by bringing the extrusion devices (51) (52) together above the surface of the base material (2) and extruding an excess of extrudate (54) before extrusion is completed.

The extrusion device can be programmed so that elongated extrudates of different heights are produced. In this manner multiheight designs are created to further enhance the article produced for use as upholstery fabric or carpeting. It should be understood that similar designs can be produced using well known methods to tuft a continuous filament of expandable extrudate into a backing material. Similarly, articles of multicolored designs are produced using known methods of tufting various colored continuous filaments of expandable extrudate or by programming a plurality of extruder heads to produce extrudate in a controlled pattern of various colors.

Understanding of the invention may be facilitated by the illustrative examples following:

EXAMPLE I

A non-woven backing material made of polypropylene as described in U.S. Pat. No. 3,452,128 is pierced by a plurality of needle-like extrusion devices. The extrusion heads are inserted through the backing so as to be exposed on the opposite side. Filaments of polypropylene containing barium azodicarbonamide foaming agent are extruded to a length of 1 inch. The extruder heads are automatically withdrawn through the backing material as extrusion continues until the extrusion head has retreated outside the surface of the base material. An excess of material is deposited on the side of the backing from which the extruder head is withdrawn. The article is subjected to a temperature of 450°F. which is sufficient to activate the foaming agent in the inserted filaments increasing the diameter of the expanded filaments and locking the inserted elements into the backing.

EXAMPLE II

A continuous unexpanded filament of polyester is extruded from a device which contains at the extrusion head multiple points through which particles of ammonium nitrate are fed discontinuously into the surface of the extruding filament. The continuous unexpanded filament is needled through a woven carpet backing of continuous fibers held in a needling apparatus to form a conventional, continuous looped surface on one side of the backing. The carpet produced is subjected to an increased temperature of 450°F which causes the nitrate particles embedded in the extrudate surface to explode. Minute explosions tear the surface of the extrudate element carrying portions of the exploded extrudates still attached to the needled filament into the interstices of the carpet backing and creating an expanded filament on either side of the backing which effectively locks the inserted filaments to the backing material.

EXAMPLE III

A non-woven carpet backing made of polypropylene is pierced by the extruder heads as in Example I. A plate coated with silicone partitioning agent is aligned with the base material away from the surface of the backing material. A foamable extrudate containing azodicarbonamide, foaming agent, is extruded between the plate and the backing material under foaming conditions of 390°F. Withdrawal of the extruder head is timed to begin when enough foam material is extruded to assure abutment of the extrudates on completion of foaming. The extruder heads are withdrawn through the base material on continuing extrusion. A distance of ½ inch from the withdrawal space of the base material the extruder heads are stopped, extrusion of material is continued to assure abutment of filaments against each other and the base material on completion of foaming. Extruder heads then withdraw to a distance of 1 inch from the base material where extrusion is stopped and the foamed filaments are severed at the extruder head. On completion of foaming, a foamed filament carpet-like article with the filaments on one side but with the non-woven backing sealed on both sides has been produced.

In U.S. Pat. No. 3,305,429, issued Feb. 21, 1967, a method for producing a non-woven fabric with a foamed binding is taught wherein a random material of natural and nonfoamable synthetic fibers is steeped in a liquid expansion agent for a time sufficient for the expansion agent to be absorbed but not to completely penetrate the synthetic fiber. On exposure to heat the expansion agent foams binding the nonfoamable fibers together.

Reasonable variation and modification are possible within the scope of the foregoing disclosure, the drawings and the appended claims to the invention the essence of which is that a method is provided for fixing an extrudate element inserted into a base material to the said base material wherein the inserted extrudate element, the base material, or both are expandable by causing the expandable element to enlarge after insertion of the extrudate element into the base material and that an article consisting of inserted elements fixed into a base material can be produced thereby.

I claim:

1. An article comprising a plurality of filamentous elements inserted into a base material matrix so as to extend from the face thereof, said filamentous elements fixed into said base material by interacting pressure of the adjacent surfaces of the inserted filamentous elements and the base material matrix due to expansion of at least one of said inserted elements and said base material subsequent to insertion.

2. An article of claim 1 wherein said expansion is caused by foaming of a foamable substance.

3. An article of claim 2 wherein the matrix is polypropylene and the foamable substance is azodicarbonamide.

4. An article of claim 1 wherein a plurality of filamentous elements are inserted in said base material matrix to form a pile surface on at least one side of said base material.

5. An article comprising filamentous elements of at least partially unexpanded expandable extrudate containing expansion agent said filamentous elements inserted into a base material matrix so as to extend from the face thereof.

6. An article comprising filamentous elements inserted into a base material matrix comprising a knitted, woven or non-woven mat of an at least partially unexpanded expandable extrudate containing an expansion agent.

* * * * *